(12) United States Patent
Takeyoshi et al.

(10) Patent No.: US 9,638,124 B2
(45) Date of Patent: May 2, 2017

(54) CONTROL DEVICE FOR ENGINE

(71) Applicant: Mazda Motor Corporation, Aki-gun, Hiroshima (JP)

(72) Inventors: Toru Takeyoshi, Hiroshima (JP); Keisuke Agusa, Aki-gun (JP); Yoji Watanabe, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 67 days.

(21) Appl. No.: 14/859,044

(22) Filed: Sep. 18, 2015

(65) Prior Publication Data
US 2016/0273469 A1   Sep. 22, 2016

(30) Foreign Application Priority Data

Mar. 19, 2015 (JP) ................. 2015-056339

(51) Int. Cl.
*F02M 1/00* (2006.01)
*F02D 41/10* (2006.01)
*F02D 11/10* (2006.01)
*B60K 26/02* (2006.01)
(Continued)

(52) U.S. Cl.
CPC ............ *F02D 41/10* (2013.01); *B60K 26/021* (2013.01); *F02D 11/105* (2013.01); *F02D 11/106* (2013.01); *B60K 2026/023* (2013.01); *F02D 41/0225* (2013.01); *F02D 41/2422* (2013.01); *F02D 2200/501* (2013.01); *F02D 2250/18* (2013.01)

(58) Field of Classification Search
CPC ............ F02D 19/081; F02D 2011/101; F02D 2011/103; F02D 9/105; F02M 69/18

USPC ..... 123/434, 462, 376, 406.23, 406.24, 402, 123/403; 701/103, 110, 114, 115

See application file for complete search history.

(56) References Cited

U.S. PATENT DOCUMENTS

2005/0177308 A1* 8/2005 Tange ................. B60T 8/17557
  701/301
2012/0221220 A1   8/2012 Yamazaki et al.
2014/0379213 A1* 12/2014 Otake ................ G08G 1/09626
  701/36

FOREIGN PATENT DOCUMENTS

JP    H04345541 A    12/1992
JP    2005155412 A    6/2005
JP    2006117020 A    5/2006
(Continued)

*Primary Examiner* — John Kwon
(74) *Attorney, Agent, or Firm* — Alleman Hall Creasman & Tuttle LLP

(57) ABSTRACT

A control system for an engine adjusts an engine torque based on an operation of an organ-type accelerator pedal for pivoting about a supporting point. The control system includes an accelerator opening acquiring module for acquiring an accelerator opening, a target acceleration setting module for setting a target acceleration of a vehicle based on the acquired acceleration opening, and an engine control module for adjusting the engine torque to achieve the set target acceleration. The target acceleration setting module sets the target acceleration corresponding to the acquired accelerator opening by using a predetermined range of the accelerator opening including a value at which the target acceleration becomes zero. The predetermined range is set such that a pedal reaction force F (N) applied from a predetermined position of the accelerator pedal when the accelerator opening is within the predetermined range is within a range of $2.5 \leq F \leq 26$.

19 Claims, 14 Drawing Sheets

(51) Int. Cl.
  *F02D 41/02*  (2006.01)
  *F02D 41/24*  (2006.01)

(56) References Cited

FOREIGN PATENT DOCUMENTS

| | | |
|---|---|---|
| JP | 2006123603 A | 5/2006 |
| JP | 2010264831 A | 11/2010 |
| JP | 2014088137 A | 5/2014 |

* cited by examiner

| RELATIONSHIP OF PEDAL REACTION FORCE WITH UP-HYS AND LOW-HYS THRESHOLDS | | | | |
|---|---|---|---|---|
| VEHICLE SPEED (KM/H) | WITHOUT VARIATION | | WITH VARIATION ± 3N | |
| | LOW-HYS THRESHOLD (N) | UP-HYS THRESHOLD (N) | LOW-HYS THRESHOLD (N) | UP-HYS THRESHOLD (N) |
| 0 | --- | --- | --- | --- |
| 80 | 7 | 19 | 4 | 22 |
| 120 | 7.5 | 21 | 4.5 | 24 |
| 200 | 9 | 23 | 6 | 26 |

FIG. 12

CONTROL DEVICE FOR ENGINE

BACKGROUND

The present invention relates to a control device for an engine, particularly to a control device for an engine, which adjusts an engine torque according to an operation of an accelerator pedal performed by a driver.

JP2005-155412A discloses such a kind of art. In JP2005-155412A, a target torque of an engine is set based on a state of accelerator operation performed by a driver, and an output torque of the engine is adjusted to reach the target torque by adjusting a throttle opening and/or an ignition timing. Specifically, in this art, an output torque of an engine is adjusted such that an acceleration of a vehicle in its longitudinal direction becomes higher as a depressing speed of an accelerator pedal (i.e., a differential value of an accelerator opening) becomes higher, so as to gain an acceleration feeling and reduce vibration of the vehicle in its longitudinal direction.

Meanwhile, when traveling on a rotary, a roundabout (a circular intersection where a plurality of branch roads are connected with a circular passage, which is usually seen in Europe), or a limited speed zone where a vehicle speed is limited to be low, a driver intends to drive at a constant vehicle speed. In this case, the driver tends to operate the accelerator pedal slightly and repeatedly so as to keep the vehicle speed constant. With the conventional art, when the driver operates the accelerator pedal slightly and repeatedly as described above, the acceleration varies according to the variation of the accelerator opening. Therefore, it is difficult to keep the vehicle speed constant. In other words, with the conventional art, it is difficult to control the vehicle to maintain the constant vehicle speed.

As a solution, improving a characteristic of the acceleration in relation to an operation of an accelerator pedal, in order to easily maintain the constant vehicle speed is considered to be effective. Further, it can be said to be advantageous to suitably maintain the constant vehicle speed as described above when the accelerator pedal is operated in a state where the driver applies almost no intentional force with his/her foot when stepping on the accelerator pedal (i.e., the accelerator pedal is stepped on (depressed) with the weight of the foot itself).

SUMMARY

The present invention is made in view of the above situations and aims to provide a control device for an engine, which can suitably maintain a constant vehicle speed when accelerator operation is performed in a state where a driver applies almost no intentional force with his/her foot.

According to an aspect of the present invention, a control system for an engine, is provided. The control system adjusts an engine torque based on an operation of an organ-type accelerator pedal for pivoting about a supporting point. The control system includes an accelerator opening acquiring module for acquiring an accelerator opening that is a position of the accelerator pedal, a target acceleration setting module for setting a target acceleration of a vehicle based on the accelerator opening acquired by the accelerator opening acquiring module, and an engine control module for adjusting the engine torque to achieve the target acceleration set by the target acceleration setting module. The target acceleration setting module sets the target acceleration corresponding to the accelerator opening acquired by the accelerator opening acquiring module, by using a predetermined range of the accelerator opening including a value at which the target acceleration becomes zero. The predetermined range is set such that a pedal reaction force F (N) applied from a predetermined position of the accelerator pedal when the accelerator opening is within the predetermined range is within a range of "$2.5(N) \leq F \leq 26(N)$," the predetermined position being 172 (mm) away from the supporting point of the accelerator pedal.

According to this configuration, when the accelerator pedal is operated in a state where a driver applies almost no intentional force with his/her foot to depress the accelerator pedal (i.e., the accelerator pedal is depressed with the weight of his/her foot itself), the accelerator opening in such a case is within the predetermined range (the range of the accelerator opening including the value at which the target acceleration becomes zero). Therefore, when traveling on a rotary, a roundabout, or a limited speed zone where the vehicle speed is limited to be low, etc., even if the driver operates the accelerator pedal slightly and repeatedly so as to keep the vehicle speed constant, the target acceleration set according to the accelerator opening corresponding to such accelerator operation tends to become close to zero. Thus, the variation of the vehicle speed can suitably be suppressed.

Therefore, according to this configuration, the driver can easily maintain the constant vehicle speed, in other words, can easily control the vehicle to maintain the constant vehicle speed, when the driver operates the accelerator pedal while applying almost no intentional force with his/her foot.

Further, the predetermined range is preferably set such that the pedal reaction force F(N) applied when the accelerator opening is within the predetermined range is within a range expressed by the following Equation 1 defined with a vehicle speed V (km/h).

$$F \leq 0.0321V + 19.7 \qquad (1)$$

With this configuration, the predetermined range is set such that the pedal reaction force F(N) applied when the accelerator opening is within the predetermined range is within the range expressed by Equation 1 defined with the vehicle speed V (km/h). Specifically, the predetermined range is set by defining a largest value of the range of the pedal reaction force F (N) based on the vehicle speed V (km/h). Thus, the predetermined range can suitably be set according to the vehicle speed, and by using such a predetermined range, the constant vehicle speed can more easily be maintained.

Further, the predetermined range is preferably set such that the pedal reaction force F (N) applied when the accelerator opening is within the predetermined range is within a range expressed by the following Equation 2 defined with the vehicle speed V (km/h).

$$F \geq 0.017V + 2.57 \qquad (2)$$

With this configuration, the predetermined range is set such that the pedal reaction force F (N) applied when the accelerator opening is within the predetermined range is within the range expressed by Equation 2 defined with the vehicle speed V (km/h). Specifically, the predetermined range is set by defining a smallest value of the range of the pedal reaction force F (N) based on the vehicle speed V (km/h). Thus, the predetermined range can suitably be set according to the vehicle speed, and by using such a predetermined range, the constant vehicle speed can more easily be maintained.

The predetermined range is preferably set such that the pedal reaction force F (N) applied when the accelerator opening is within the predetermined range is within a range of "2.5(N)<F<23(N)."

With this configuration, the predetermined range is set by using the range of the pedal reaction force F (N) that is obtained based on a vehicle speed range which is frequently used in normal operation, such that the pedal reaction force F (N) applied when the accelerator opening is within the predetermined range is within the range of "2.5(N)≤F≤23 (N)." Thus, the vehicle speed within the frequently-used vehicle speed range can more easily be kept constant.

When the accelerator opening is within the predetermined range, the target acceleration setting module preferably causes a change of the target acceleration with respect to a change of the accelerator opening to be smaller than when the accelerator opening is above the predetermined range and larger than when the accelerator opening is below the predetermined range.

With this configuration, when the accelerator opening is within the predetermined range, even if the driver operates the accelerator pedal slightly and repeatedly so as to keep the vehicle speed constant, variation of the target acceleration which is set according to the accelerator opening corresponding to such accelerator operation becomes small. As a result, the vehicle speed is suitably kept substantially constant. Thus, the vehicle can more easily be controlled to maintain the constant vehicle speed.

Moreover, according to this configuration, when the accelerator opening is above the predetermined range, the change of the target acceleration with respect to the change of the accelerator opening is adjusted to be larger. Therefore, the vehicle can swiftly be accelerated according to an increase of the accelerator opening. In other words, the driver can gain a satisfactory acceleration feeling. In addition, according to this configuration, when the accelerator opening is below the predetermined range, the change of the target acceleration with respect to the change of the accelerator opening is adjusted to be smaller. Therefore, variation of the acceleration according to the variation of the accelerator opening within a small value range, for example, the variation of the accelerator opening caused by the "play" of the accelerator pedal, can suitably be suppressed.

When the accelerator opening is within the predetermined range, the target acceleration setting module preferably causes a change of the target acceleration with respect to a change of the accelerator opening to be substantially constant regardless of a gear position of the vehicle.

With this configuration, within the predetermined range of the accelerator opening, the target acceleration corresponding to the accelerator opening is set such that the change of the target acceleration with respect to the change of the accelerator opening is substantially constant regardless of the gear position of a transmission of the vehicle. Thus, within the predetermined range, the change of the acceleration with respect to the change of the accelerator opening can be substantially the same among various gear positions. Therefore, the constant vehicle speed can easily be maintained regardless of the gear position.

When the accelerator opening is within the predetermined range, the target acceleration setting module preferably causes a change of the target acceleration with respect to a change of the accelerator opening to be substantially constant regardless of a vehicle speed.

With this configuration, within the predetermined range of the accelerator opening, the target acceleration corresponding to the accelerator opening is set such that the change of the target acceleration with respect to the change of the accelerator opening is substantially constant regardless of the vehicle speed. Thus, within the predetermined range, the change of the acceleration with respect to the change of the accelerator opening can be substantially the same among various vehicle speeds. Therefore, the constant vehicle speed can easily be maintained regardless of the vehicle speed.

According to another aspect of the present invention, a method of controlling a control system for an engine is provided. The control system adjusts an engine torque based on operation of an organ-type accelerator pedal for pivoting about a supporting point. The method includes acquiring an accelerator opening that is a position of the accelerator pedal, setting a target acceleration of a vehicle based on the acquired accelerator opening, and adjusting the engine torque to achieve the set target acceleration. The setting of the target acceleration includes setting the target acceleration corresponding to the acquired accelerator opening, by using a predetermined range of the accelerator opening including a value at which the target acceleration becomes zero. The predetermined range is set such that a pedal reaction force F (N) applied from a predetermined position of the accelerator pedal when the accelerator opening is within the predetermined range is within a range of "2.5(N) ≤F≤26(N)," the predetermined position being 172 (mm) away from the supporting point of the accelerator pedal.

With this configuration, the target acceleration corresponding to the acquired accelerator opening is set by using the predetermined range of the accelerator opening including the value of the accelerator opening at which the target acceleration becomes zero. Moreover, such a predetermined range of the accelerator opening is set such that the pedal reaction force F (N) applied from the predetermined position being 172 (mm) away from the supporting point (pivot point) of the accelerator pedal is within the range of "2.5 (N)≤F≤26(N)" when the accelerator opening is within the predetermined range.

According to this configuration, when the accelerator pedal is operated in a state where a driver applies almost no intentional force with his/her foot to depress the accelerator pedal (i.e., the accelerator pedal is depressed with the weight of the foot itself), the accelerator opening for such a case is within the predetermined range (the range of the accelerator opening including the value at which the target acceleration becomes zero). Therefore, when traveling on a rotary, a roundabout, or a limited speed zone where the vehicle speed is limited to be low, etc., even if the driver operates the accelerator pedal slightly and repeatedly so as to keep the vehicle speed constant, the target acceleration set according to the accelerator opening corresponding to such accelerator operation tends to become close to zero. Thus, variation of the vehicle speed can suitably be suppressed.

Therefore, according to this configuration, the driver can easily maintain the constant vehicle speed, in other words, can easily control the vehicle to maintain the constant vehicle speed, when the driver operates the accelerator pedal while applying almost no intentional force with his/her foot.

BRIEF DESCRIPTION OF THE DRAWINGS

FIG. 12 is a table including specific values of an upper threshold and a lower threshold of a hysteresis for respective vehicle speeds, obtained in the embodiment of the present invention.

DETAILED DESCRIPTION OF EMBODIMENT

Hereinafter, a control device for an engine according to one embodiment of the present invention is described with reference to the appended drawings.

System Configuration

Figure 1:
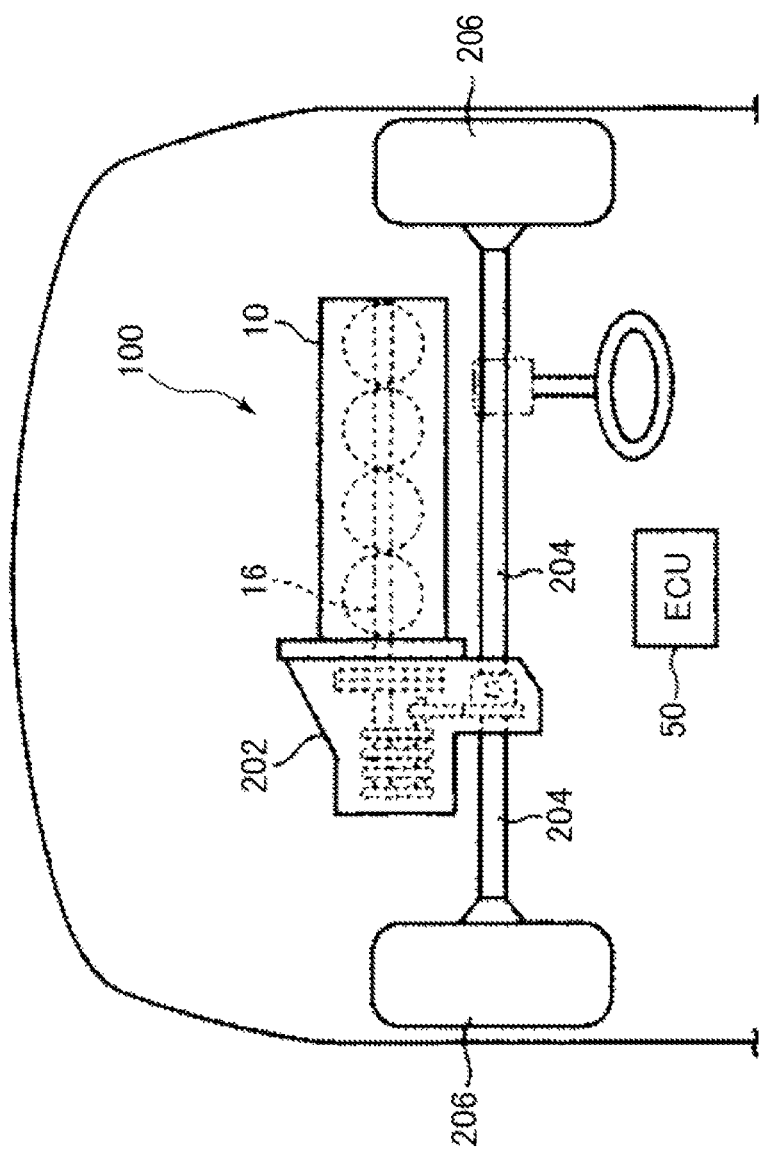
FIG. 1 is a plan view illustrating a schematic configuration of a vehicle to which a control device for an engine according to one embodiment of the present invention is applied.
Figure 2:
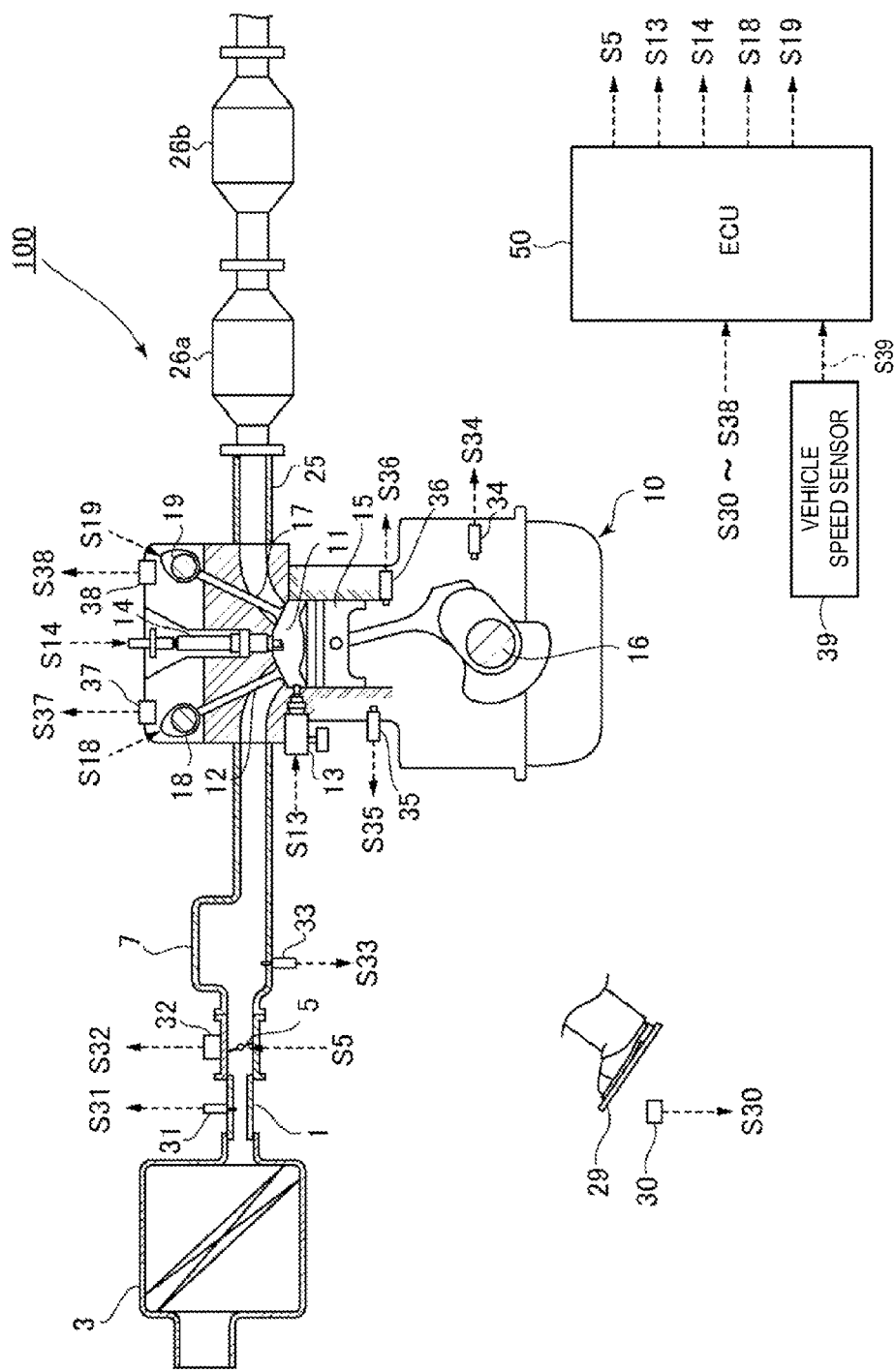
FIG. 2 is a view illustrating a schematic configuration of an engine system to which the control device for the engine according to the embodiment of the present invention is applied.

First, an engine system to which the control device for the engine of this embodiment is applied is described with reference to FIGS. 1 and 2. FIG. 1 is a plan view illustrating a schematic configuration of a vehicle to which the control device for the engine according to this embodiment of the present invention is applied. FIG. 2 is a view illustrating a schematic configuration of the engine system to which the control device for the engine according to this embodiment of the present invention is applied.

As illustrated in FIG. 1, in the vehicle, the engine 10 of the engine system 100 produces an engine torque (drive torque) as a thrust of the vehicle by causing combustion of mixture gas containing fuel and air, and transfers the engine torque to a transmission 202 via a crankshaft 16. The transmission 202 changes a gear position among a plurality of positions (e.g., first to sixth ranges), and at a gear position set by the transmission 202, the engine torque from the engine 10 is transferred, via a pair of drive shafts 204, to a pair of wheels 206 attached to outer end parts of the drive shafts 204 in vehicle width directions, respectively.

Further, in the vehicle, an ECU (Electronic Control Unit) 50 performs various controls within the vehicle. In this embodiment, the ECU 50 functions as the control device of the engine. According to an operation of an accelerator pedal (accelerator) by a driver, the ECU 50 adjusts the engine torque which is outputted by the engine 10, and supplies the engine torque to the vehicle. Thus, the ECU 50 improves a desirable acceleration characteristic in relation to the accelerator operation.

As illustrated in FIG. 2, the engine system 100 includes an intake passage 1 through which intake air (air) introduced from outside passes, the engine (specifically, gasoline engine) 10 for producing a drive force of the vehicle by causing combustion of the mixture gas containing the intake air supplied from the intake passage 1 and the fuel supplied from a fuel injector 13 (described later), an exhaust passage 25 for discharging exhaust gas produced by the combustion within the engine 10, sensors 30 to 39 for detecting various states regarding the engine system 100, and the ECU 50 for controlling the engine system 100 entirely.

The intake passage 1 is provided with, from its upstream side in the following order, an air cleaner 3 for purifying the intake air introduced from outside, a throttle valve 5 for adjusting an amount of intake air passing therethrough (intake air amount), and a surge tank 7 for temporarily storing the intake air to be supplied to the engine 10.

The engine 10 mainly includes an intake valve 12 for introducing, into a combustion chamber 11, the intake air supplied from the intake passage 1, the fuel injector 13 for injecting the fuel to the combustion chamber 11, an ignition plug 14 for igniting the mixture gas (containing the intake air and the fuel) supplied into the combustion chamber 11, a piston 15 for reciprocating due to the combustion of the mixture gas within the combustion chamber 11, the crankshaft 16 which is rotated by the reciprocation of the piston 15, and an exhaust valve 17 for discharging, to the exhaust passage 25, the exhaust gas produced by the combustion of the mixture gas within the combustion chamber 11.

Moreover, the engine 10 varies operation timings of the intake and exhaust valves 12 and 17 (corresponding to phases of the valves) by a variable intake valve mechanism 18 and a variable exhaust valve mechanism 19 (both being a variable valve timing mechanism), respectively. Various known types thereof may be applied for the variable intake valve mechanism 18 and the variable exhaust valve mechanism 19, and for example, an electromagnetic-operated type mechanism or a hydraulic type mechanism may be used to change the operation timings of the intake valve 12 and the exhaust valve 17.

The exhaust passage 25 is mainly provided with exhaust gas purifying catalysts 26a and 26b having a function of purifying the exhaust gas, such as an NOx catalyst, a three-way catalyst, or an oxidation catalyst. Hereinafter, when the exhaust gas purifying catalysts 26a and 26b are not differentiated, they may each simply be described as the "exhaust gas purifying catalyst 26."

Further, the engine system 100 is provided with the sensors 30 to 39 for detecting the various states regarding the engine system 100. The sensors 30 to 39 are specifically as follows: the accelerator opening sensor 30 for detecting a position of the accelerator pedal 29 (corresponding to an amount by which the driver depresses the accelerator pedal 29); the airflow sensor 31 for detecting the intake air amount corresponding to the flow rate of the intake air passing through the intake passage 1; the throttle opening sensor 32 for detecting an opening of the throttle valve 5 (throttle opening); the pressure sensor 33 for detecting an intake manifold pressure corresponding to the pressure of the intake air which is supplied to the engine 10; the crank angle sensor 34 for detecting a crank angle of the crankshaft 16; the water temperature sensor 35 for detecting a temperature of cooling water for cooling the engine 10 (water temperature); the temperature sensor 36 for detecting a temperature inside a cylinder of the engine 10 (in-cylinder temperature); the cam angle sensors 37 and 38 for detecting the operation timings (including close timings) of the intake and exhaust valves 12 and 17, respectively; and the vehicle speed sensor 39 for detecting the speed of the vehicle (vehicle speed). These various sensors 30 to 39 output respective detection signals S30 to S39 corresponding to the detected parameters, to the ECU 50.

The ECU 50 controls the components of the engine system 100 based on the detection signals S30 to S39 received from the various sensors 30 to 39 described above. Specifically, the ECU 50 supplies a control signal S5 to the throttle valve 5 to adjust open and close timings of the throttle valve 5 and the throttle opening, supplies a control signal S13 to the fuel injector 13 to adjust a fuel injection amount and a fuel injection timing, supplies a control signal S14 to the ignition plug 14 to adjust an ignition timing, and supplies control signals S18 and S19 to the variable intake valve mechanism 18 and the variable exhaust valve mechanism 19 to adjust the operation timings of the intake and exhaust valves 12 and 17, respectively.

Figure 3:
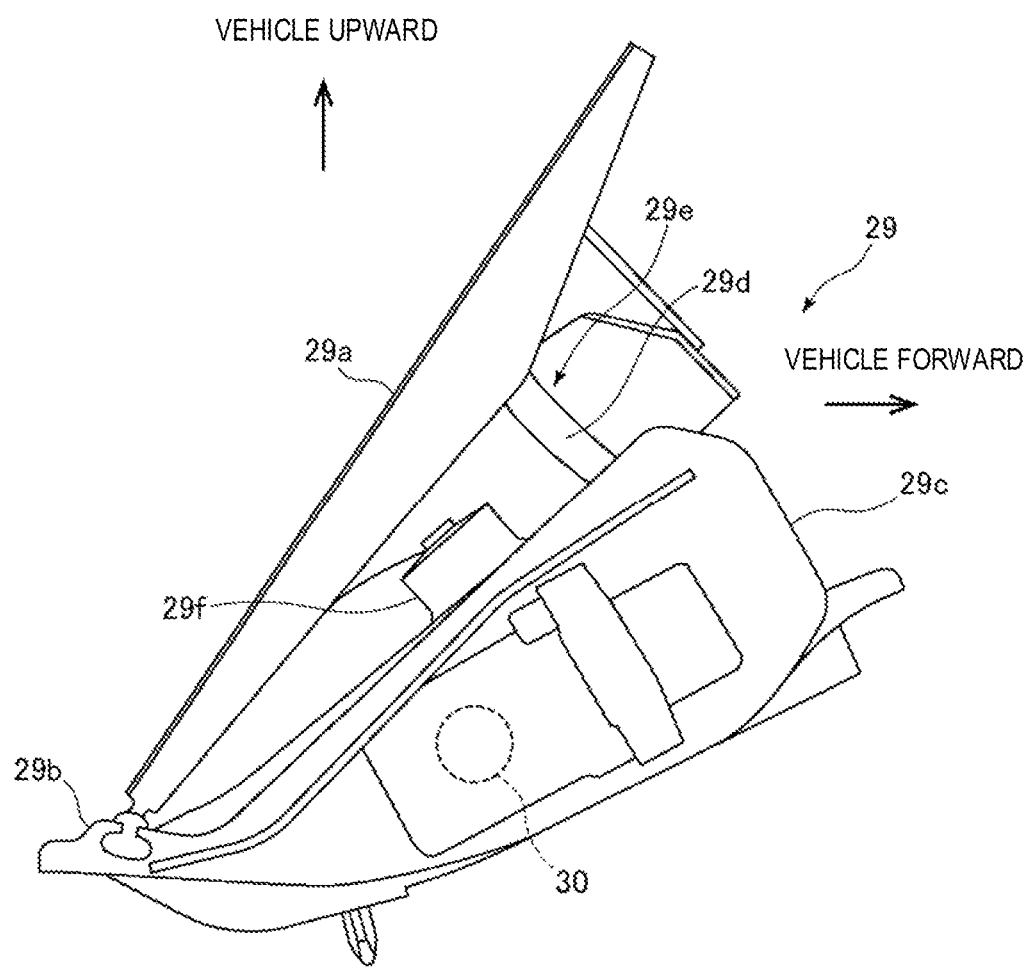
FIG. 3 is a side view of an accelerator pedal according to the embodiment of the present invention.

Next, a configuration of the accelerator pedal 29 of this embodiment is described with reference to FIG. 3. FIG. 3 is a side view of the accelerator pedal 29 according to the embodiment of the present invention.

As illustrated in FIG. 3, the accelerator pedal 29 is configured as an organ-type pedal, and includes a pedal part 29a pivotably attached to a base part 29b. The pedal part 29a is pivotably supported at its lower end by the base part 29b so as to stand therefrom, and pivots by a predetermined angle (e.g.,)15.1° from an initial position corresponding to a no-load state (the illustrated state) to a terminal position on a vehicle forward side, due to being depressed by the driver.

Further, a housing 29c integrally formed with the base part 29b is provided below the pedal part 29a. A restoring spring (not illustrated), a so-called return spring, is provided inside the housing 29c, and a plurality of links 29d (three links in total to be specific, although only one of them is illustrated in FIG. 3) are provided between an internal structure body of the housing 29c and the pedal part 29a. Such a restoring spring and the plurality of links 29d configure a pedal reaction force producing mechanism 29e. The pedal reaction force producing mechanism 29e produces a reaction force in proportion to a pivot amount of the pedal part 29a (see the pedal reaction force within a normal operation range in FIG. 4).

Further, the housing 29c is provided with the accelerator opening sensor 30 described above. The accelerator opening sensor 30 produces the detection signal S30 corresponding to the accelerator opening according to the pivoted position (angle) of the pedal part 29a.

Further, a kick down switch 29f is provided at an upper surface part of the housing 29c facing a lower surface of the pedal part 29a. At a position near the terminal position when the pedal part 29a is depressed, the kick down switch 29f produces a predetermined peak reaction force (see the pedal reaction force within a kick down stroke range in FIG. 4) larger than that produced by the pedal reaction force producing mechanism 29e, to act against the pivot of the pedal part 29a to the terminal position. When the pedal part 29a is depressed against the peak reaction force of the pedal reaction force producing mechanism 29e, the accelerator opening sensor 30 detects this operation and produces the detection signal S30 corresponding to a kick down signal, so as to automatically shift down the transmission 202 (to a lower gear position). Thus, the engine torque and the vehicle speed are increased.

Figure 4:
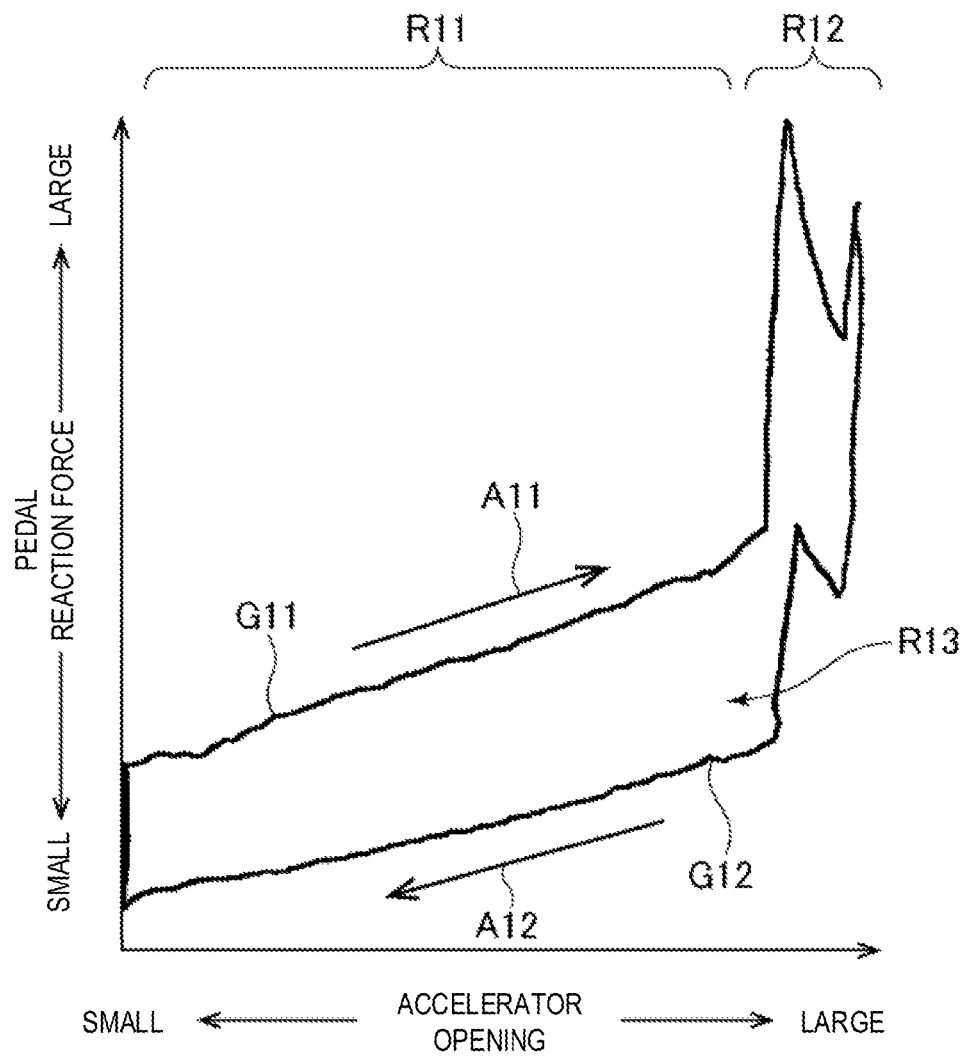
FIG. 4 is a pedal characteristic chart illustrating one example of a relationship between an accelerator opening and a pedal reaction force according to the embodiment of the present invention.

Next, the pedal reaction force of the accelerator pedal 29 of this embodiment is described with reference to FIG. 4. FIG. 4 is a pedal characteristic chart illustrating one example of a relationship between the accelerator opening and the pedal reaction force caused by the accelerator pedal 29 according to the embodiment of the present invention. In FIG. 4, the horizontal axis indicates the accelerator opening and the vertical axis indicates the pedal reaction force. Note that the pedal reaction force is a force which is applied to the sole of the foot of the driver by the accelerator pedal 29, in other words, it corresponds to a depressing force which is applied to the accelerator pedal 29 by the foot (same hereinafter). For example, the pedal reaction force is measured by a pressure sensor provided at a predetermined position of the accelerator pedal 29.

In FIG. 4, a range R11 of the accelerator opening is the normal operation range where only the pedal reaction force is applied by the pedal reaction force producing mechanism 29e of the accelerator pedal 29, and a range R12 where the accelerator opening is larger than the range R11 is the kick down stroke range where the pedal reaction force caused by the kick down switch 29f of the accelerator pedal 29 is applied in addition to the pedal reaction force caused by pedal reaction force producing mechanism 29e.

Moreover, a graph G11 indicates a relationship between the accelerator opening and the pedal reaction force caused by the pedal reaction force producing mechanism 29e, which is applied when the accelerator pedal 29 is depressed (see the arrow A11). On the other hand, a graph G12 indicates a relationship between the accelerator opening and the pedal reaction force caused by the pedal reaction force producing mechanism 29e, which is applied when the accelerator pedal 29 is released (see the arrow A12). As illustrated in FIG. 4, a hysteresis indicated by the reference numeral R13 is provided between the graph G11 and the graph G12. Thus, different pedal reaction forces are applied when the accelerator pedal 29 is depressed and released, even at the same accelerator opening. Such a hysteresis R13 is achieved by friction of the pedal reaction force producing mechanism 29e, etc.

Note that for the case of depressing the accelerator pedal 29, the characteristic of the accelerator pedal 29 indicated by the graph G11 may be set such that the pedal reaction force becomes larger than the weight of the foot (the weight of an ankle itself) so as to require the driver to operate the accelerator pedal 29 by applying an intentional force with his/her foot. On the other hand, for the case of releasing the accelerator pedal 29, the characteristic of the accelerator pedal 29 indicated by the graph G12 may be set such that the pedal reaction force becomes smaller than the weight of the foot (the weight of the ankle itself) so as to allow the driver to operate the accelerator pedal 29 with almost no intentional force with his/her foot. In this manner, when the driver releases the accelerator pedal 29 to keep it at a predetermined accelerator opening, almost no intentional force of the foot is required from the driver.

Figure 5:
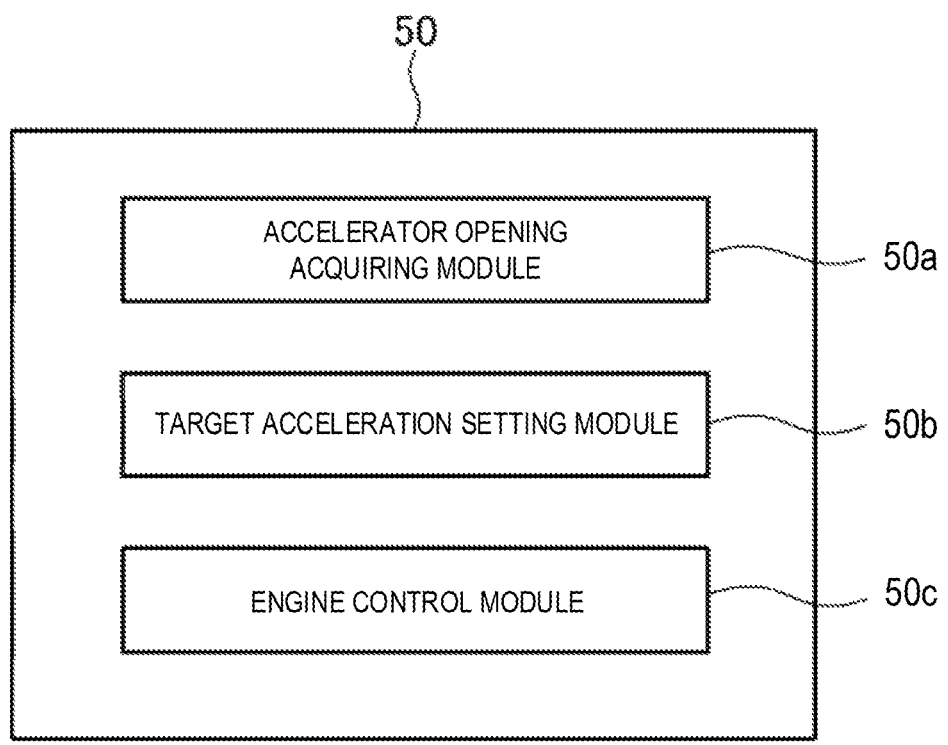
FIG. 5 is a block diagram illustrating a functional configuration of an engine control unit (ECU) according to the embodiment of the present invention.

Next, a functional configuration of the ECU 50 of this embodiment is described with reference to FIG. 5. As illustrated in FIG. 5, the ECU 50 of this embodiment functionally has an accelerator opening acquiring module 50a, a target acceleration setting module 50b, and an engine control module 50c.

The accelerator opening acquiring module 50a acquires the accelerator opening (e.g., expressed in "%") based on the detection signal S30 outputted by the accelerator opening sensor 30.

The target acceleration setting module 50b sets a target acceleration of the vehicle based on the accelerator opening acquired by the accelerator opening acquiring module 50a. Specifically, the target acceleration setting module 50b sets the target acceleration corresponding to the accelerator opening acquired by the accelerator opening acquiring module 50a, by referring to a map in which the target acceleration to be set in relation to the accelerator opening is defined before use (acceleration characteristic map).

The engine control module 50c adjusts the engine torque to achieve the target acceleration set by the target acceleration setting module 50b. Specifically, the engine control module 50c sets a target torque required for shifting an actual acceleration to the target acceleration, and controls the throttle valve 5 and/or the intake valve 12 through the variable intake valve mechanism 18, and additionally controls the fuel injector 13, etc., so as to cause the engine 10 to output the target torque.

Thus, the ECU 50 may be referred to as "the control device for the engine."

Acceleration Characteristic

Next, an acceleration characteristic applied in this embodiment is described. First, an acceleration characteristic map of this embodiment, in which a characteristic of the target acceleration to be set in relation to the accelerator opening is defined, is described in detail. As described above, the acceleration characteristic map is used for the target acceleration setting module 50b of the ECU 50 to set the target acceleration.

Figure 6:
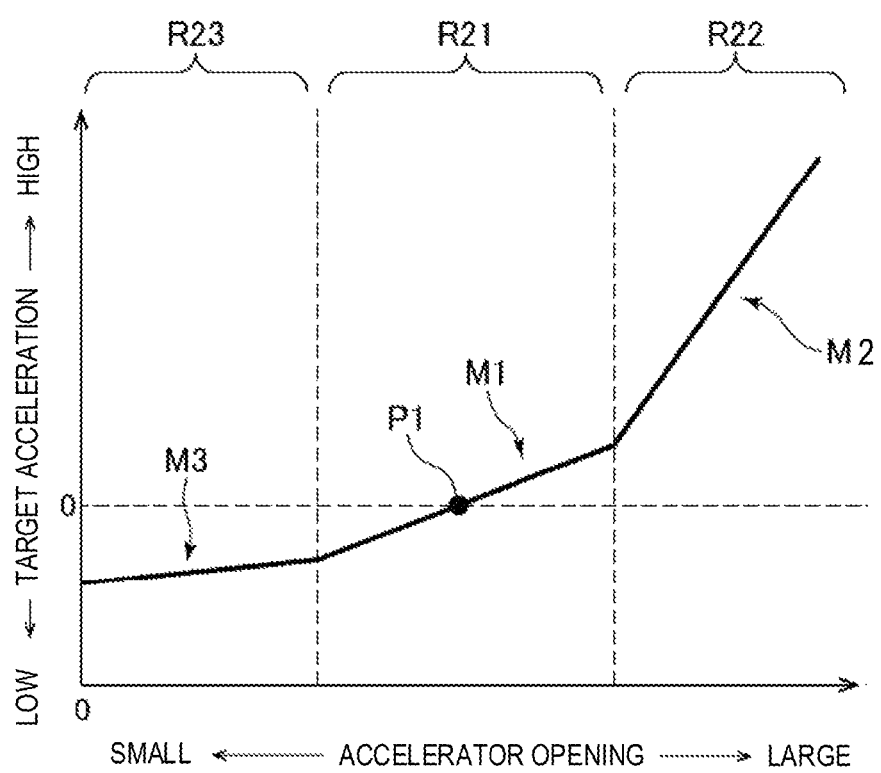
FIG. 6 is a chart illustrating one example of an acceleration characteristic map according to the embodiment of the present invention.

FIG. 6 is a chart illustrating one example of the acceleration characteristic map according to the embodiment of the present invention. In FIG. 6, the horizontal axis indicates the accelerator opening, and the vertical axis indicates the target acceleration. In the vertical axis, the upper side of "0" (zero) indicates values of the target acceleration which cause the vehicle to accelerate, and the lower side of zero indicates values of the target acceleration which cause the vehicle to decelerate (target deceleration). In other words, the "0" at the origin of the chart (where the vertical and horizontal axes intersect with each other) does not mean that the acceleration is zero, but means that the accelerator opening is zero. Note that the acceleration characteristic map in FIG. 6 is a single map applied for a certain gear position and a certain vehicle speed.

As illustrated in FIG. 6, in this embodiment, the accelerator opening is defined to have three ranges (first to third ranges R21, R22, and R23). Further in this embodiment, three acceleration characteristic map segments (first to third acceleration characteristic map segments M1, M2 and M3) are defined as maps which are applied to the first to third ranges R21, R22, and R23, respectively. In this embodiment, the first to third acceleration characteristic map segments constitute the above-described single map applied for a certain gear position and a certain vehicle speed.

The first range R21 of the accelerator opening includes a value of the accelerator opening at which the target acceleration becomes zero (see the point P1). In this embodiment, although described in detail later, such a first range R21 is defined based on a range of the accelerator opening to which the accelerator pedal 29 is set when the accelerator pedal 29 is operated in a state where the driver applies almost no intentional force with his/her foot (i.e., a state of depressing the accelerator pedal 29 with the weight of the foot itself). In one example, a range of about ±5% centering on the value of the accelerator opening corresponding to the point P1 is applied as the first range R21, whereas the second range R22 of the accelerator opening is a range where the accelerator opening is larger than the first range R21, and the third range R23 of the accelerator opening is a range including the accelerator opening "0" and where the accelerator opening is smaller than the first range R21.

Note that the first range R21 including the value of the accelerator opening at which the target acceleration becomes zero is, in other words, a range including a value of the accelerator opening at which traveling resistance (including air resistance, road surface resistance and resistance received from a road depending on its inclination) balances with the drive force which is applied to the wheels. In other words, the value of the accelerator opening at which the target acceleration becomes zero corresponds to the value of the accelerator opening at which such traveling resistance balances with the drive force which is applied to the wheels.

The first acceleration characteristic map segment M1 applied to the first range R21 described above is defined to have a smaller (more gradual) inclination indicating the change of the target acceleration with respect to the change of the accelerator opening, compared to the second acceleration characteristic map segment M2 applied to the second range R22. According to such a first acceleration characteristic map segment M1, the change of the acceleration corresponding to the change of the accelerator opening within the first range R21 is smaller than that within the second range R22 to which the second acceleration characteristic map segment M2 is applied. In other words, the second acceleration characteristic map segment M2 is defined to have a larger (steeper) inclination indicating the change of the target acceleration with respect to the change of the accelerator opening, compared to the first acceleration characteristic map segment M1. According to such a second acceleration characteristic map segment M2, the vehicle smoothly accelerates according to an increase of the accelerator opening within the second range R22.

Further, the first acceleration characteristic map segment M1 is defined to have a larger (steeper) inclination indicating the change of the target acceleration with respect to the change of the accelerator opening, compared to the third acceleration characteristic map segment M3 applied to the third range R23. In other words, the third acceleration characteristic map segment M3 is defined to have a smaller (more gradual) inclination indicating the change of the target acceleration with respect to the change of the accelerator opening, compared to the first acceleration characteristic map segment M1. According to such a third acceleration characteristic map segment M3, the acceleration is adjusted so as not to change greatly according to the variation of the accelerator opening within a range near zero (corresponding to the "play", free travel, of the accelerator pedal 29).

In this embodiment, the target acceleration setting module 50b of the ECU 50 selects one of the first to third acceleration characteristic map segments M1 to M3 according to a range under which the accelerator opening acquired by the accelerator opening acquiring module 50a falls among the first to third ranges R21 to R23, and, by using the selected map segment, the target acceleration setting module 50b sets the target acceleration corresponding to the accelerator opening acquired by the accelerator opening acquiring module 50a.

Figure 7A:
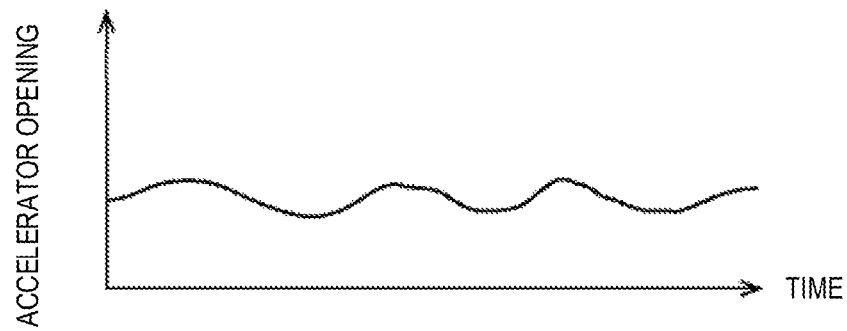
FIG. 7A to 7C show time charts illustrating changes of an accelerator opening, a target acceleration, and a vehicle speed, respectively, when a first acceleration characteristic map segment according to the embodiment of the present invention is applied.
Figure 7B:
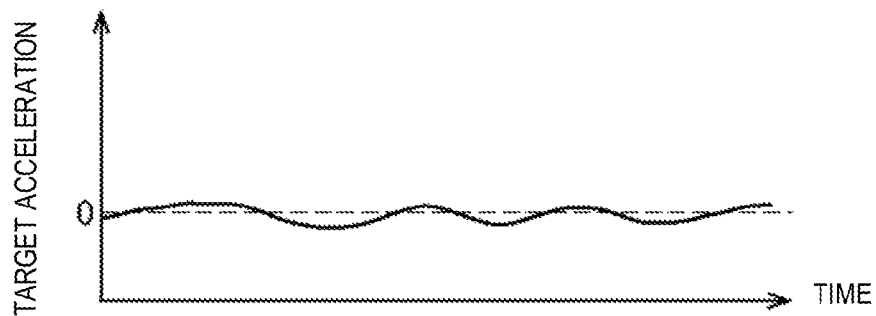
Figure 7C:
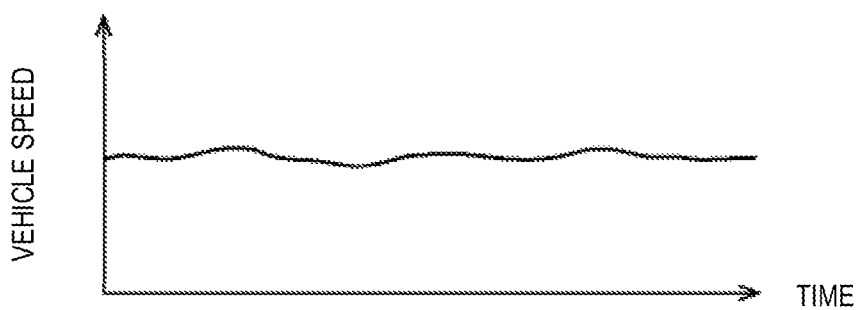

Next, a change of the vehicle speed when the first acceleration characteristic map segment M1 described above is applied is described with reference to FIGS. 7A to 7C. FIGS. 7A to 7C show time charts illustrating changes of the accelerator opening, the target acceleration, and the vehicle speed, respectively, in the case where the first acceleration characteristic map segment M1 of this embodiment is applied when the accelerator opening is within the first range R21.

FIG. 7A illustrates the change of the accelerator opening over time, FIG. 7B illustrates the change of the target acceleration over time, and FIG. 7C illustrates the change of the vehicle speed over time. Here, a case where the accelerator is operated by the driver to keep the vehicle speed constant (typically to keep the vehicle speed low) is considered. In this case, the driver tends to operate the accelerator pedal 29 slightly and repeatedly (see FIG. 7A). Since such slight and repeated operation of the accelerator pedal 29 for keeping the vehicle speed constant is performed within the first range R21 of the accelerator opening including the point P1 (see FIG. 6), the first acceleration characteristic map segment M1 is selected, and the target acceleration is set by using the first acceleration characteristic map segment M1. Therefore, the target acceleration which varies within a small range near zero is set (see FIG. 7B). As a result, the vehicle speed is suitably kept substantially constant (see FIG. 7C).

Here, the first to third acceleration characteristic map segments M1 to M3 illustrated in FIG. 6 (hereinafter, when the segment maps M1 to M3 are not differentiated, they may each simply be referred to as the "acceleration characteristic map segment") are applied for a certain gear position and a certain vehicle speed. In this embodiment, the acceleration characteristic map segments (the acceleration characteristic map as a whole) are basically defined for each gear position (i.e., the gear position set by the transmission 202, corresponding to an engine load) and each vehicle speed. In other words, in this embodiment, the acceleration characteristic map is defined according to the gear position and the vehicle speed.

Figure 8A:
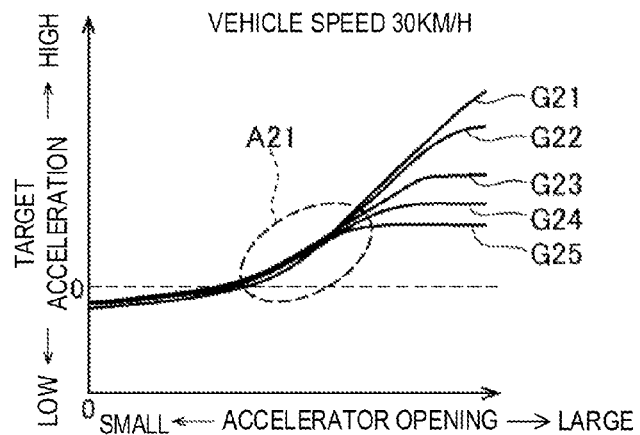
FIGS. 8A to 8C show examples of the acceleration characteristic map for different gear positions and vehicle speeds, respectively, according to the embodiment of the present invention.
Figure 8B:
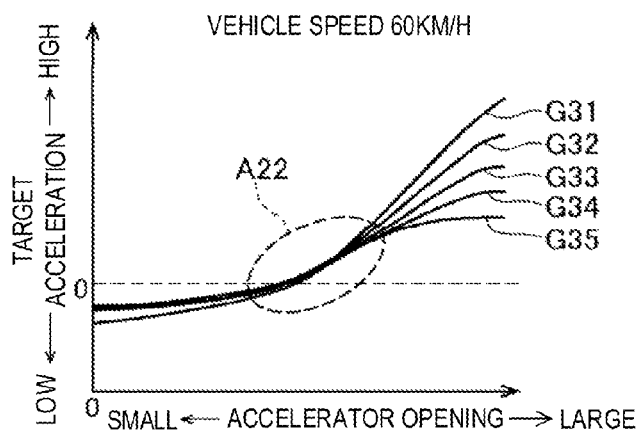
Figure 8C:
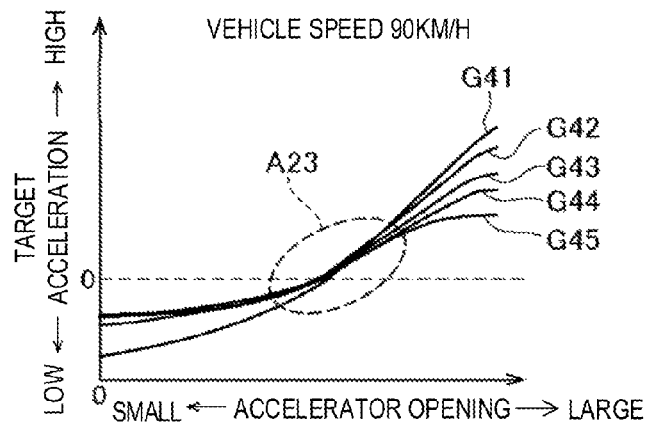

A specific example of the acceleration characteristic map for each gear position and each vehicle speed is described with reference to FIGS. 8A to 8C, which show examples of the acceleration characteristic map for different gear positions and vehicle speeds, respectively, according to this embodiment of the present invention. In FIGS. 8A to 8C, the horizontal axis indicates the accelerator opening and the vertical axis indicates the target acceleration.

Specifically, FIG. 8A illustrates the acceleration characteristic map applied at the vehicle speed of 30 km/h, FIG. 8B illustrates the acceleration characteristic map applied at the vehicle speed of 60 km/h, and FIG. 8C illustrates the acceleration characteristic map applied at the vehicle speed of 90 km/h. Further, the graphs G21 to G25 in FIG. 8A indicate the acceleration characteristic maps applied for five gear positions, respectively. The graphs G31 to G35 in FIG. 8B indicate the acceleration characteristic maps applied for the five gear positions, respectively. The graphs G41 to G45 in FIG. 8C indicate the acceleration characteristic maps applied for the five gear positions, respectively.

Note that in FIGS. 8A to 8C, the acceleration characteristic maps applied for the vehicle speeds 30 km/h, 60 km/h, and 90 km/h are illustrated as examples, but in actuality, acceleration characteristic maps applied for various other vehicle speeds (which may include 30 km/h, 60 km/h, and 90 km/h) are prepared. Further, the vehicle to which the engine system 100 of this embodiment is applied actually has the six gear positions; however, since a first gear position is exceptional, an acceleration characteristic map applied for the first gear position is not illustrated in FIGS. 8A to 8C.

As indicated by the dashed line areas A21 to A23 in FIGS. 8A to 8C, in this embodiment, the acceleration characteristic map segment M1 applied within the first range R21 described above is defined such that the change of the target acceleration with respect to the change of the accelerator opening becomes substantially constant regardless of the gear position and the vehicle speed. In other words, the acceleration characteristic map segment M1 is defined such that the inclination indicating the change of the target acceleration with respect to the change of the accelerator opening becomes substantially constant regardless of the gear position and the vehicle speed. Thus, within the first range R21, the change of the acceleration with respect to the change of the accelerator opening is substantially the same among various gear positions and vehicle speeds.

On the other hand, the second and third acceleration characteristic map segments M2 and M3 applied within the second and third ranges R22 and R23 (outside the first range R21) are defined such that the change of the target acceleration with respect to the change of the accelerator opening is different, in other words, the inclination indicating the change of the target acceleration with respect to the change of the accelerator opening is different, according to the gear position and the vehicle speed. Thus, within the second and third ranges R22 and R23, especially within the second range R22, the acceleration suitably changes according to a current gear position and a current vehicle speed.

Note that as illustrated in FIGS. 8A to 8C, it can be understood that the value of the accelerator opening at which the target acceleration becomes zero increases as the vehicle speed increases (30 km/h→60 km/h→90 km/h) because the accelerator pedal 29 is depressed in the process of increasing the vehicle speed.

Figure 9:
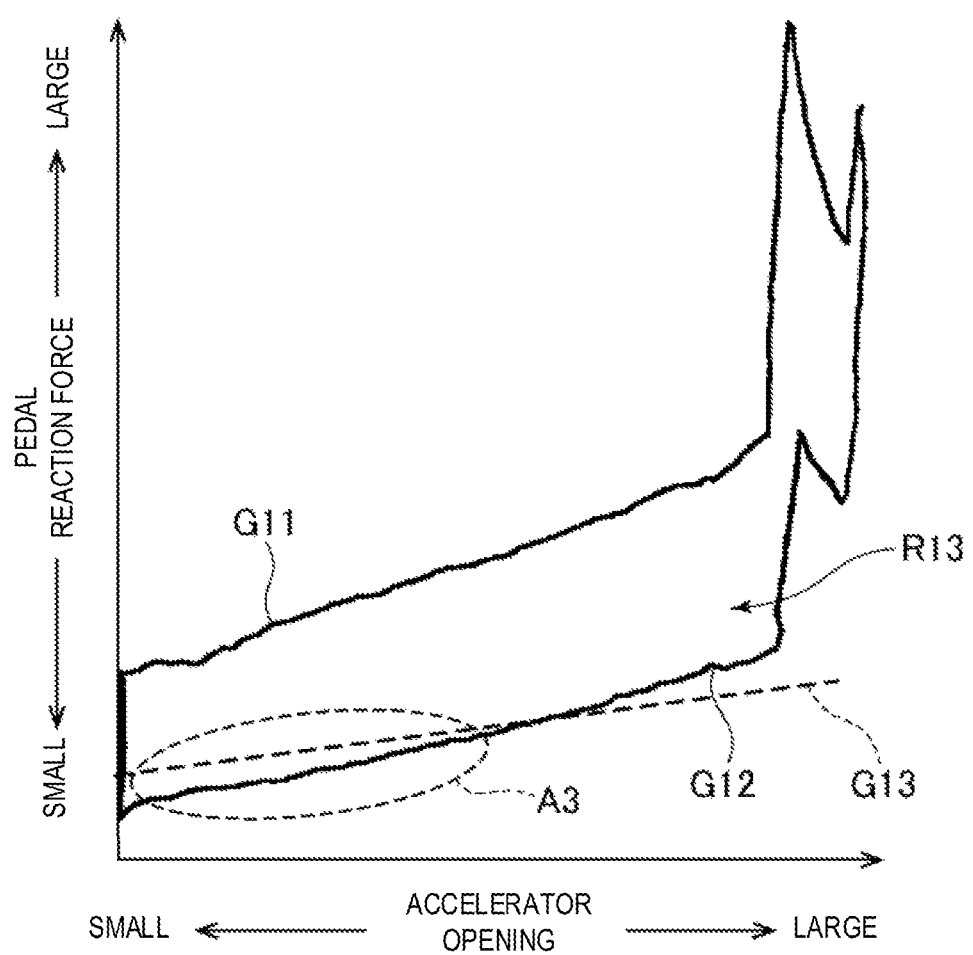
FIG. 9 is a chart illustrating a basic concept of a method of determining a first range according to the embodiment of the present invention.

Next, a basic concept of a method of determining the first range R21 of the accelerator opening (which may be referred to as "the predetermined range of the accelerator opening") in this embodiment is described with reference to FIG. 9. FIG. 9 is a chart illustrating one example of a relationship between the accelerator opening and the pedal reaction force (pedal characteristic) similar to FIG. 4. In FIG. 9, the horizontal axis indicates the accelerator opening and the vertical axis indicates the pedal reaction force, and elements which are the same as those in FIG. 4 (including elements which are not completely the same but are similar and have the same concept) are denoted with the same reference numerals and/or characters as FIG. 4.

In FIG. 9, the graph G13 indicated by the dashed line is a force applied to the accelerator pedal 29 by the weight of the foot itself (the weight of a part from the ankle to the tip of the foot) of the driver. Here, a weight of a small foot (e.g., a woman's foot) is illustrated as an example. In the graph G13, the force applied by the weight of the foot itself becomes slightly larger as the accelerator opening becomes larger because of an inclination of the accelerator pedal 29 (an inclination of the pedal part 29a with respect to the base part 29b) becomes smaller and the application of the force of the foot (force applied mainly by the weight) is easily affected by the accelerator pedal 29 (a component of force applied to the accelerator pedal 29 with the foot becomes larger), in other words, the influence of the weight (force of gravitation) of the foot on the accelerator pedal 29 becomes larger.

Here, when the force applied by the weight of the foot itself (indicated by the graph G13) is between the graphs G11 and G12 corresponding to the pedal characteristics when the accelerator pedal 29 is depressed and released, in other words, when the force applied by the weight of the foot itself is within the range of the hysteresis R13 (see the dashed-line range A3), the driver can operate the accelerator pedal 29 by applying almost no intentional force with his/her foot. Specifically in this case, the driver can operate the accelerator pedal 29 to keep a current accelerator opening by applying almost no intentional force with his/her foot. In this embodiment, at least part of the range A3 of the accelerator opening where the force applied by the weight of the foot itself (graph G13) is in the hysteresis R13 is set as the first range R21 described above. In this manner, when the driver operates the accelerator pedal 29 by using the weight of his/her foot itself with almost no intentional force of the foot, the accelerator opening at this timing is included in the first range R21. As a result, the first acceleration characteristic map segment M1 is selected to set the target acceleration. Therefore in this case, the vehicle speed can suitably be kept substantially constant (see FIG. 7C).

Note that in this specification, the definition of "the accelerator pedal is operated in the state where the driver applies almost no intentional force with his/her foot" corresponds to accelerator operation in which the accelerator pedal 29 is naturally depressed only by the movement of the ankle without the driver intentionally depressing the accelerator pedal 29 with his/her entire leg. This accelerator operation is performed by mainly using the weight of the part from the ankle to the tip of the foot (weight of that part itself).

Next, the first range R21 of this embodiment is described in detail with reference to FIGS. 10 to 13. Specifically, a range of the pedal reaction force used for defining the width of the first range R21 is described in detail.

Figure 10:
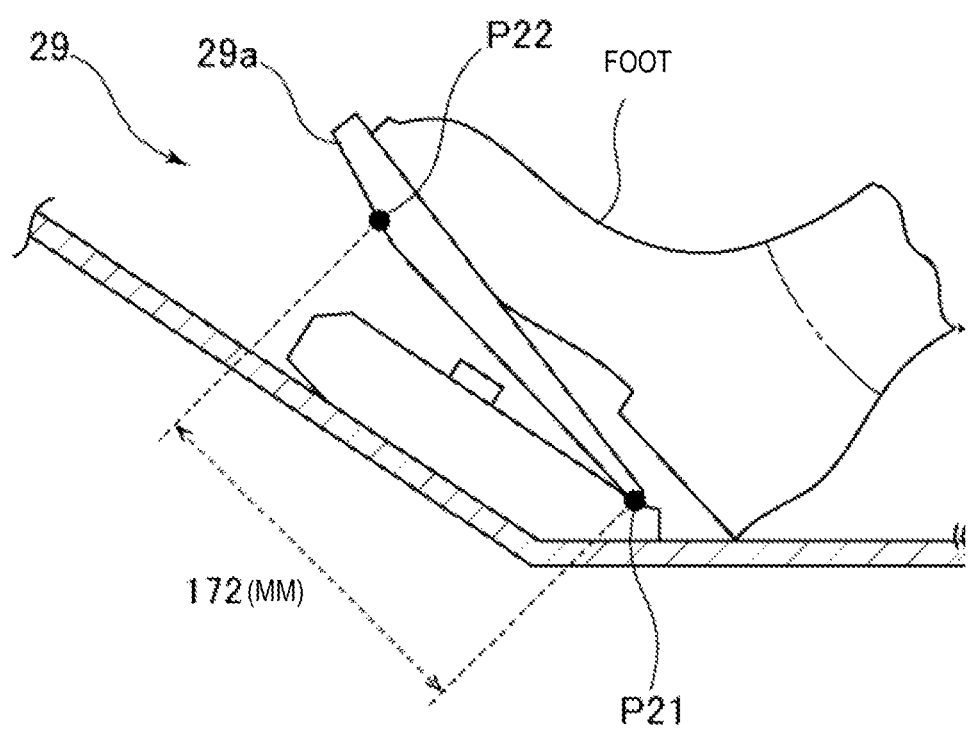
FIG. 10 is a view for describing a definition of the pedal reaction force according to the embodiment of the present invention, and illustrating a schematic side view of the accelerator pedal.

FIG. 10 is a view for describing a definition of the pedal reaction force according to the embodiment of the present invention, and illustrating a schematic side view of the accelerator pedal 29. As illustrated in FIG. 10, in this embodiment, the width of the first range 21 is defined by using a pedal reaction force applied to a position P22 which is on the pedal part 29a and 172 (mm) away from a supporting point P21 (pivot point) when the pedal part 29a of the accelerator pedal 29 pivots. For example, a pressure sensor is provided at the position P22 and the pressure measured by the pressure sensor is used as the pedal reaction force. Note that the position P22 which is 172 (mm) away from the supporting point P21 corresponds to a position of the pedal part 29a with which the ball of a large foot (e.g., a man's foot) contacts.

Figure 11:
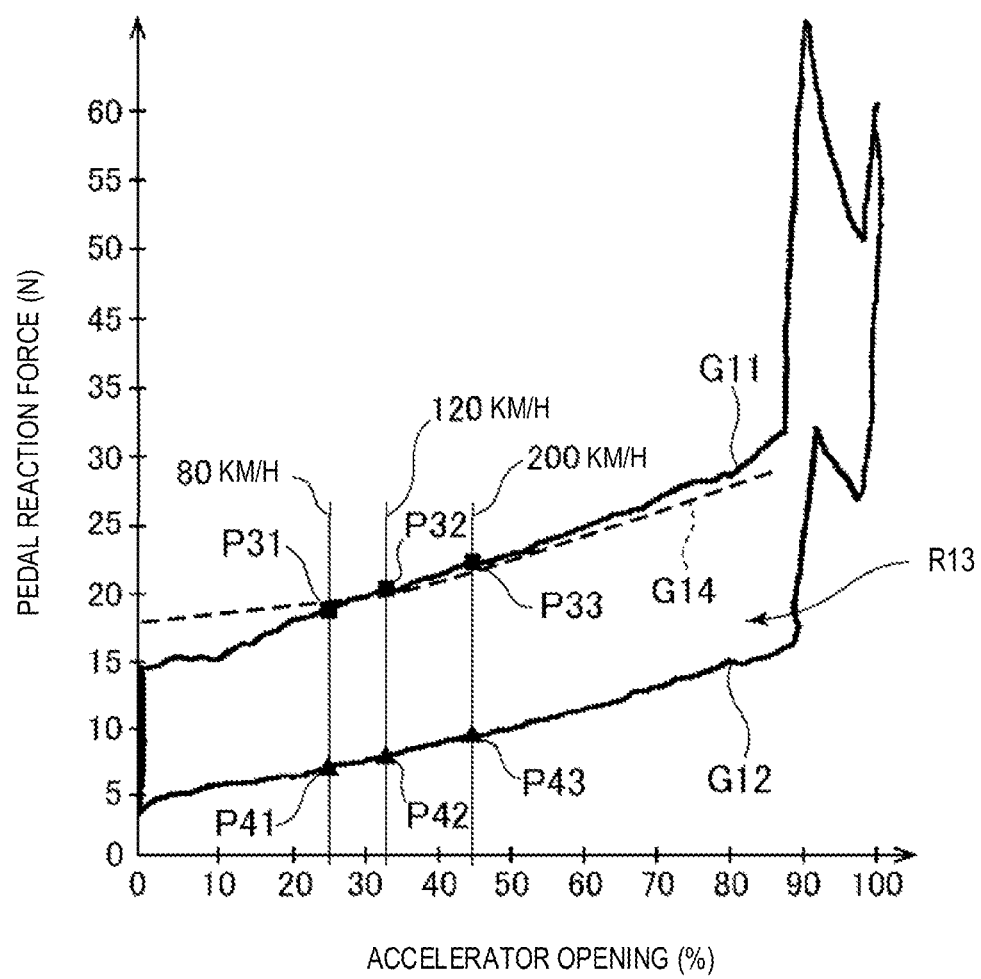
FIG. 11 is a chart illustrating a relationship between the accelerator opening and the pedal reaction force measured at a predetermined position of a pedal part illustrated in FIG. 10, obtained in the embodiment of the present invention.

FIG. 11 is a chart illustrating a relationship between the accelerator opening and the pedal reaction force measured at the position P22 on the pedal part 29a described above. In FIG. 11, the horizontal axis indicates the accelerator opening (%) and the vertical axis indicates the pedal reaction force (N), and elements which are the same as those in FIGS. 4 and 9 (including elements which are not completely the same but are similar and have the same concept) are denoted with the same reference numerals and/or characters as FIGS. 4 and 9.

In FIG. 11, the graph G14 indicates the force applied to the accelerator pedal 29 by the weight of the large (man's) foot (the part from the ankle to the tip) itself. Thus, by also referring to FIG. 9, it can be understood that the force applied by the weight of the large (man's) foot itself is larger than that by the weight of the small (woman's) foot itself.

Next, a case is considered, in which from the first acceleration characteristic map segments M1 defined for respective vehicle speeds as described above, values of the accelerator opening at which the target acceleration becomes zero are acquired for arbitrary vehicle speeds, and a range of the pedal reaction force corresponding to the hysteresis R13 at the acquired accelerator openings is acquired. Here, the arbitrary vehicle speeds are 80 (km/h), 120 (km/h), and 200 (km/h). In this example, 25% is acquired as the value of the accelerator opening at which the target acceleration becomes zero from the first acceleration characteristic map segment M1 for 80 (km/h), 32% is acquired as the value of the accelerator opening at which the target acceleration becomes zero from the first acceleration characteristic map segment M1 for 120 (km/h), and 45% is acquired as the value of the accelerator opening at which the target acceleration becomes zero from the first acceleration characteristic map segment M1 for 200 (km/h). Note that the first acceleration characteristic map segments M1 for the respective vehicle speeds are not illustrated.

As a result, as illustrated in FIG. 11, an upper threshold P31 and a lower threshold P41 of the pedal reaction force (N) defining the range of the hysteresis R13 are acquired at the accelerator opening of 25% for 80 (km/h) (hereinafter, the pedal reaction force defining the upper threshold of the hysteresis may simply be referred to as the "up-HYS threshold," and the pedal reaction force defining the lower threshold of the hysteresis may simply be referred to as the "low-HYS threshold"). Similarly an up-HYS threshold P32 and a low-HYS threshold P42 are acquired at the accelerator opening of 32% for 120 (km/h) and an up-HYS threshold P33 and a low-HYS threshold P43 are acquired at the accelerator opening of 45% for 200 (km/h).

FIG. 12 is a table including specific values of the up-HYS thresholds P31, P32, and P33 and the low-HYS thresholds P41, P42, and P43 for 80 (km/h), 120 (km/h), and 200 (km/h) described above. As illustrated in FIG. 12, the low-HYS threshold P41 and the up-HYS threshold P31 for 80 (km/h) are 7 (N) and 19 (N), the low-HYS threshold P42 and the up-HYS threshold P32 for 120 (km/h) are 7.5 (N) and 21 (N), and the low-HYS threshold P43 and the up-HYS threshold P33 for 200 (km/h) are 9 (N) and 23 (N).

Further, FIG. 12 also includes the up-HYS thresholds and the low-HYS thresholds taking a variation of the pedal reaction force into consideration. Here, the variation is ±3 (N). Thus, as illustrated in FIG. 12, for 80 (km/h), the low-HYS threshold with the variation becomes 4 (N) by subtracting 3 (N) from 7 (N) which is the low-HYS threshold P41, and the up-HYS threshold with the variation becomes 22 (N) by adding 3 (N) to 19 (N) which is the up-HYS threshold P31. Similarly, for 120 (km/h), the low-HYS threshold with the variation becomes 4.5 (N) and the up-HYS threshold with the variation becomes 24 (N), and for 200 (km/h), the low-HYS threshold with the variation becomes 6 (N) and the up-HYS threshold with the variation becomes 26 (N).

Figure 13:
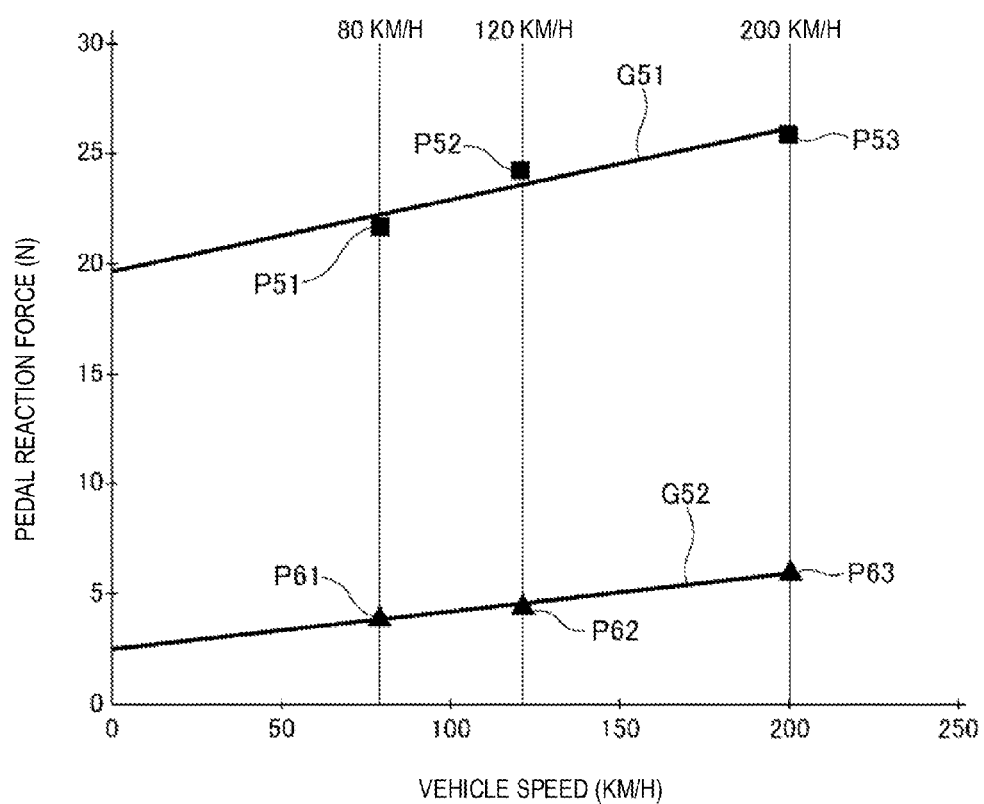
FIG. 13 is a chart illustrating a relationship of the vehicle speed with the upper and lower thresholds of the hysteresis, obtained in the embodiment of the present invention.

FIG. 13 is a chart illustrating a relationship of the vehicle speed with the up-HYS threshold and the low-HYS threshold based on the up-HYS thresholds and the low-HYS thresholds obtained for the respective vehicle speeds in FIG. 12 (using the thresholds with the variation). In FIG. 13, the horizontal axis indicates the vehicle speed (km/h) and the vertical axis indicates the pedal reaction force (N).

In FIG. 13, points P51 and P61 indicate the up-HYS threshold and the low-HYS threshold with the variation at 80 (km/h), points P52 and P62 indicate the up-HYS threshold and the low-HYS threshold with the variation at 120 (km/h), and points P53 and P63 indicate the up-HYS threshold and the low-HYS threshold with the variation at 200 (km/h). An approximate line indicated by the graph G51 can be obtained based on the up-HYS thresholds P51, P52, and P53 at 80 (km/h), 120 (km/h) and 200 (km/h). When the pedal reaction force (N) is "F" and the vehicle speed (km/h) is "V," the approximate line indicated by the graph G51 can be expressed by the following Equation 3. Moreover, an approximate line indicated by the graph G52 can be obtained based on the low-HYS thresholds P61, P62 and P63 at 80 (km/h), 120 (km/h) and 200 (km/h), and the approximate line indicated by the graph G52 can be expressed by the following Equation 4.

$$F=0.0321V+19.714 \quad (3)$$

$$F=0.017V+2.5714 \quad (4)$$

Here, a case where a range of the vehicle speed between 0 and 200 (km/h) is used to define the range of the pedal reaction force F (N) corresponding to the hysteresis R13, is considered. Based on Equation 3, the pedal reaction force F (N) corresponding to the up-HYS threshold at 200 (km/h) is substantially 26 (N), and based on Equation 4, the pedal reaction force F (N) corresponding to the low-HYS threshold at 0 (km/h) is substantially 2.5 (N). Therefore, between 0 and 200 (km/h), a largest value of the pedal reaction force F (N) corresponding to the hysteresis R13 becomes substantially 26 (N), and a smallest value of the pedal reaction force F (N) corresponding to the hysteresis R13 becomes substantially 2.5 (N). Thus, within the range of the vehicle speed between 0 and 200 (km/h), the range of the pedal reaction force F (N) corresponding to the hysteresis R13 becomes "2.5(N)≤F≤26(N)."

In this embodiment, the first range R21 is set based on such a range of the pedal reaction force F (N). Specifically, the first range R21 is set such that the pedal reaction force F (N) applied to the position P22, which is 172 mm away from the supporting point P21 on the pedal part 29a of the accelerator pedal 29, is within the range of "2.5(N)≤F≤26 (N)" when the accelerator opening is within the first range R21.

In a preferable example, the first range R21 may be set such that the pedal reaction force F (N) applied to the position P22 on the pedal part 29a when the accelerator opening is within the first range R21 is within a range expressed by the following Equation 5 that is established based on Equation 3 described above. Equation 5 is obtained by defining the largest value of the pedal reaction force F (N) corresponding to the vehicle speed V (km/h).

$$F≤0.0321V+19.7 \quad (5)$$

In another preferable example, the first range R21 may be set such that the pedal reaction force F (N) applied to the position P22 on the pedal part 29a when the accelerator opening is within the first range R21 is within a range expressed by the following Equation 6 established based on Equation 4 described above. Equation 6 is obtained by defining the smallest value of the pedal reaction force F (N) corresponding to the vehicle speed V (km/h).

$$F≥0.017V+2.57 \quad (6)$$

In a further preferable example, the first range R21 may be set such that the range of the pedal reaction force F (N) applied to the position P22 on the pedal part 29a when the accelerator opening is within the first range R21 is "2.5(N) ≤F≤23(N)." The largest value "23 (N)" defining the range is obtained by substituting "100 (km/h)" in Equation 3. The range of the pedal reaction force F (N) defined by using "23 (N)" is obtained based on a vehicle speed range (0 to 100 km/h) which is frequently used in normal operations.

Note that the various ranges of the pedal reaction force F (N) described above are defined by representatively using the position P22 which is 172 mm away from the supporting point P21 on the pedal part 29a of the accelerator pedal 29. Therefore, on the pedal part 29a other than the position P22 (i.e., positions of the pedal part 29a where the distance from the supporting point P21 is not 172 mm), the range of the pedal reaction force F (N) is obviously different from the example described above. Specifically, when defining at a position of the pedal part 29a where the distance from the supporting point P21 is larger than 172 mm, the range of the pedal reaction force F (N) is shifted lower, and when defining at a position of the pedal part 29a where the distance from the supporting point P21 is smaller than 172 mm, the range of the pedal reaction force F (N) is shifted higher. In this case, the value of the pedal reaction force F (N) is in inverse proportion to the distance from the supporting point P21. Therefore, the range of the pedal reaction force F (N) shifts by an amount corresponding to such a relationship.

Thus, in the embodiment described above, the range of the pedal reaction force F (N) defined at the position P22 which is on the pedal part 29a and 172 mm away from the supporting point P21 is given merely as an example, and the width of the various ranges of the pedal reaction force F (N) shifted according to the position on the pedal part 29a (i.e., according to the distance from the supporting point P21) is substantially the same as the range of the pedal reaction force F (N) raised in the embodiment.

Control

Figure 14:
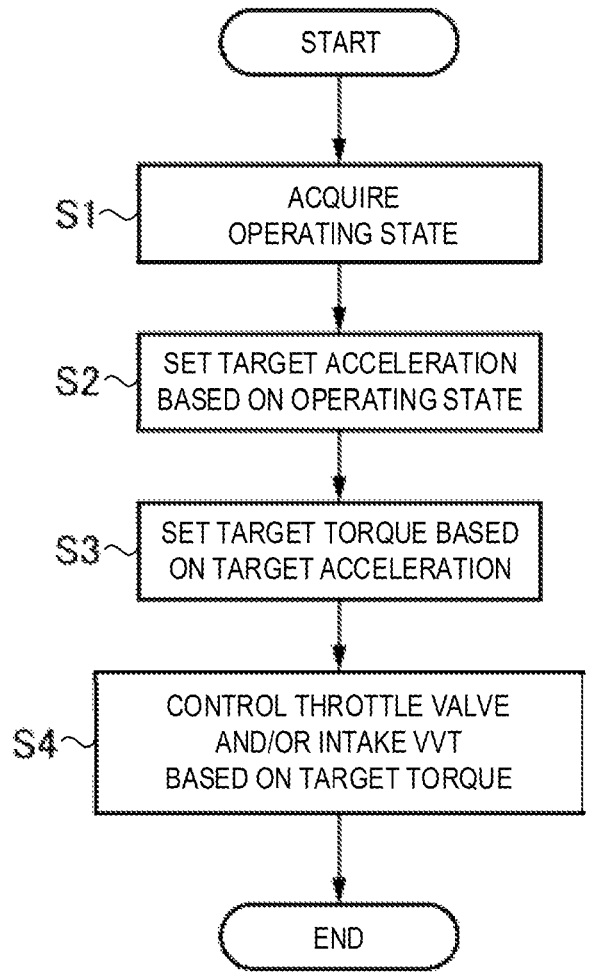
FIG. 14 is a flowchart illustrating an engine control according to the embodiment of the present invention.

Next, the engine control of this embodiment is described with reference to FIG. 14, which is a flowchart illustrating the engine control according to the embodiment of the present invention. This flow is repeated at a predetermined time cycle by the ECU 50 of the engine system 100.

First at S1, the ECU 50 acquires an operating state of the vehicle. Specifically, the ECU 50 acquires, as the operating state of the vehicle, the accelerator opening detected by the accelerator opening sensor 30 (specifically, the accelerator opening acquired by the accelerator opening acquiring module 50a of the ECU 50 based on the detection signal S30 outputted by the accelerator opening sensor 30), the vehicle speed detected by the vehicle speed sensor 39, the gear position currently set at the transmission 202, etc.

Next at S2, the target acceleration setting module 50b of the ECU 50 sets the target acceleration based on the accelerator opening, the vehicle speed, and the gear position acquired at S1. Specifically, the target acceleration setting module 50b first selects an acceleration characteristic map corresponding to the current vehicle speed and the current gear position, from the acceleration characteristic maps defined for various vehicle speeds and gear positions (the acceleration characteristic maps are created and stored in a memory or the like before use). Then, according to the range under which the current accelerator opening falls among the first to third ranges R21 to R23, the target acceleration setting module 50b further selects one of the first to third acceleration characteristic map segments M1 to M3 of the acceleration characteristic map selected based on the vehicle speed and the gear position, and the target acceleration setting module 50b sets the target acceleration corresponding to the current accelerator opening by referring the selected map segment.

Then, at S3, the engine control module 50c of the ECU 50 sets the target torque of the engine 10 so as to achieve the target acceleration set at S2. In this case, the engine control module 50c sets the target torque based on the current vehicle speed, etc., because when the vehicle speed increases, the traveling resistance becomes high, and therefore, the target torque needs to be set large. Moreover, the engine control module 50c sets the target torque within a range that the engine 10 can output.

Subsequently, at S4, the engine control module 50c controls the engine 10 to output the target torque set at S3. Specifically, the engine control module 50c adjusts the opening of the throttle valve 5 and/or the operation timing of the intake valve 12 through the variable intake valve mechanism 18 (intake VVT control) by taking into consideration the intake air amount detected by the airflow sensor 31, so that the air amount corresponding to the target torque is introduced into the engine 10. The engine control module 50c also controls the fuel injector 13 to inject the fuel injection amount determined based on the theoretical air-fuel ratio thereof with the air amount which corresponds to the target torque.

Operations and Effects

Next, the operations and effects of the control device for the engine of this embodiment are described.

In this embodiment, the first range R21 (see FIG. 6) including the value of the accelerator opening at which the target acceleration becomes zero is set such that the pedal reaction force F (N) applied to the position which is 172 mm away from the supporting point P21 of the pedal part 29a of the accelerator pedal 29, is within the range of "2.5(N) ≤F≤26(N)" when the accelerator opening is within the first range R21 (see FIG. 13), and the target acceleration corresponding to the current accelerator opening is set according to the first acceleration characteristic map segment M1 defined for such a first range R21, so as to control the engine torque.

According to such an embodiment, when the accelerator pedal 29 is operated in the state where the driver applies almost no intentional force with his/her foot to depress the accelerator pedal 29 (i.e., the accelerator pedal 29 is depressed with the weight of the foot itself), the accelerator opening for such a case is within the first range R21 and the first acceleration characteristic map segment M1 in which the inclination indicating the change of the target acceleration with respect to the change of the accelerator opening is more gradual is applied. Therefore, when traveling on a rotary, a roundabout, or a limited speed zone where the vehicle speed is limited to be low, etc., even if the driver operates the accelerator pedal 29 slightly and repeatedly so as to keep the vehicle speed constant, the variation of the target acceleration which is set according to the accelerator opening corresponding to the accelerator operation becomes small. As a result, the vehicle speed can suitably be kept substantially constant. Thus, according to this embodiment, the driver can easily maintain the constant vehicle speed, in other words, can easily control the vehicle to maintain the constant vehicle speed, when the driver operates the accelerator pedal 29 while applying almost no intentional force with his/her foot.

Particularly in this embodiment, the first range R21 is set such that the pedal reaction force F (N) applied when the accelerator opening is within the first range R21 is within the range expressed by Equation 5 and/or Equation 6 defined with the vehicle speed. Specifically, the first range R21 is set based on the range (the largest value and/or the smallest value) of the pedal reaction force F (N) corresponding to the vehicle speed. Thus, the first range R21 can be set suitably for the vehicle speed, and by using such a first range R21, the constant vehicle speed can more easily be maintained.

Further, according to this embodiment, the first range R21 is set such that the range of the pedal reaction force F (N) applied when the accelerator opening is within the first range R21 becomes "2.5(N)≤F≤23(N)." Since the range of the pedal reaction force F (N) is obtained based on the vehicle speed range (0 to 100 km/h) which is frequently used in normal operations, by using the first range R21 corresponding to the range of the pedal reaction force F (N), the vehicle speed within the frequently-used vehicle speed range can more easily be kept constant.

Moreover, according to this embodiment, the second acceleration characteristic map segment M2 in which the inclination indicating the change of the target acceleration with respect to the change of the accelerator opening is steep is applied within the second range R22 where the accelerator opening is larger than the first range R21 (see FIG. 6). Therefore, the vehicle can swiftly be accelerated according to the increase of the accelerator opening within the second range R22. In other words, the driver can gain a satisfactory acceleration feeling. Moreover, according to this embodiment, the third acceleration characteristic map segment M3 in which the inclination indicating the change of the target acceleration with respect to the change of the accelerator opening is more gentle than the first acceleration characteristic map segment M1 which is applied within the third range R23 where the accelerator opening is smaller than the first range R21 (see FIG. 6). Therefore, significant variation of the acceleration according to the variation of the accelerator opening near zero, for example, the variation of the accelerator opening caused by the "play" of the accelerator pedal 29 (free travel), can suitably be suppressed.

Furthermore, in this embodiment, the first acceleration characteristic map segment M1 applied within the first range R21 including the value of the accelerator opening at which the target acceleration becomes zero is defined such that the change of the target acceleration with respect to the change of the accelerator opening becomes substantially constant regardless of the gear position and the vehicle speed (FIGS. 8A to 8C). Thus, within the first range R21, the change of the acceleration with respect to the change of the accelerator opening can be substantially the same among various gear positions and vehicle speeds. Therefore, according to the embodiment, the constant vehicle speed can easily be maintained regardless of the gear position and the vehicle speed.

Modifications

In the above embodiment, the configuration in which the present invention is applied to the engine 10 which is the gasoline engine (see FIG. 2) is provided; however, the present invention is not limited to be applied to the gasoline engine, and may similarly be applied to a diesel engine.

Further, in the above embodiment, the first acceleration characteristic map segment M1 is defined such that the change of the target acceleration with respect to the change of the accelerator opening becomes substantially constant regardless of both of the gear position and the vehicle speed (FIGS. 8A to 8C). In another example, the first acceleration characteristic map segment M1 may be defined such that the change of the target acceleration with respect to the change of the accelerator opening is substantially constant regardless of the vehicle speed, while the change of the target acceleration with respect to the change of the accelerator opening is different according to the gear position. In yet another example, the first acceleration characteristic map segment M1 may be defined such that the change of the target acceleration with respect to the change of the accelerator opening is substantially constant regardless of the gear position, while the change of the target acceleration with respect to the change of the accelerator opening is different according to the vehicle speed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
5 Throttle Valve
10 Engine
13 Fuel Injector
18 Variable Intake Valve Mechanism
25 Exhaust Passage
29 Accelerator Pedal
29a Pedal Part
30 Accelerator Opening Sensor
39 Vehicle Speed Sensor
50 ECU
50a Accelerator Opening Acquiring Module
50b Target Acceleration Setting Module
50c Engine Control Module
100 Engine System
M1 First Acceleration Characteristic Map Segment
M2 Second Acceleration Characteristic Map Segment
M3 Third Acceleration Characteristic Map Segment
R21 First Range
R22 Second Range
R23 Third Range

What is claimed is:

1. A control system for an engine, the control system adjusting an engine torque based on operation of an organ-type accelerator pedal for pivoting about a supporting point, and the control system comprising:
an accelerator opening acquiring module for acquiring an accelerator opening that is a position of the accelerator pedal;
a target acceleration setting module for setting a target acceleration of a vehicle based on the accelerator opening acquired by the accelerator opening acquiring module; and
an engine control module for adjusting the engine torque to achieve the target acceleration set by the target acceleration setting module,
wherein the target acceleration setting module sets the target acceleration corresponding to the accelerator opening acquired by the accelerator opening acquiring module, by using a predetermined range of the accelerator opening including a value at which the target acceleration becomes zero, and
wherein the predetermined range is set such that a pedal reaction force F (N) applied from a predetermined position of the accelerator pedal when the accelerator opening is within the predetermined range is within a range of "2.5(N)≤F≤26(N)," the predetermined position being 172 (mm) away from the supporting point of the accelerator pedal.

2. The system of claim 1, wherein the predetermined range is set such that the pedal reaction force F(N) applied when the accelerator opening is within the predetermined range is within a range expressed by the following Equation 2 defined with a vehicle speed V(km/h)

$$F \geq 0.017V + 2.57 \qquad (2).$$

3. The system of claim 1, wherein the predetermined range is set such that the pedal reaction force F(N) applied when the accelerator opening is within the predetermined range is within a range of "2.5(N)≤F≤23(N)".

4. The system of claim 1, wherein when the accelerator opening is within the predetermined range, the target acceleration setting module causes a change of the target acceleration with respect to a change of the accelerator opening to be smaller than when the accelerator opening is above the predetermined range and larger than when the accelerator opening is below the predetermined range.

5. The system of claim 1, wherein when the accelerator opening is within the predetermined range, the target acceleration setting module causes a change of the target acceleration with respect to a change of the accelerator opening to be substantially constant regardless of a gear position of the vehicle.

6. The system of claim 1, wherein when the accelerator opening is within the predetermined range, the target acceleration setting module causes a change of the target acceleration with respect to a change of the accelerator opening to be substantially constant regardless of a vehicle speed.

7. The system of claim 1, wherein the predetermined range is set such that the pedal reaction force F(N) applied when the accelerator opening is within the predetermined range is within a range expressed by the following Equation 1 defined with a vehicle speed V(km/h)

$$F \leq 0.0321V + 19.7 \qquad (1).$$

8. The system of claim 7, wherein when the accelerator opening is within the predetermined range, the target acceleration setting module causes a change of the target acceleration with respect to a change of the accelerator opening to be substantially constant regardless of a gear position of the vehicle.

9. The system of claim 7, wherein when the accelerator opening is within the predetermined range, the target acceleration setting module causes a change of the target acceleration with respect to a change of the accelerator opening to be smaller than when the accelerator opening is above the predetermined range and larger than when the accelerator opening is below the predetermined range.

10. The system of claim 7, wherein the predetermined range is set such that the pedal reaction force F(N) applied when the accelerator opening is within the predetermined range is within a range of "2.5(N)≤F≤23(N)".

11. The system of claim 10, wherein when the accelerator opening is within the predetermined range, the target acceleration setting module causes a change of the target acceleration with respect to a change of the accelerator opening to be substantially constant regardless of the vehicle speed.

12. The system of claim 7, wherein the predetermined range is set such that the pedal reaction force F(N) applied when the accelerator opening is within the predetermined range is within a range expressed by the following Equation 2 defined with the vehicle speed V(km/h)

$$F \geq 0.017V + 2.57 \qquad (2).$$

13. The system of claim 12, wherein when the accelerator opening is within the predetermined range, the target acceleration setting module causes a change of the target acceleration with respect to a change of the accelerator opening to be smaller than when the accelerator opening is above the predetermined range and larger than when the accelerator opening is below the predetermined range.

14. The system of claim 12, wherein when the accelerator opening is within the predetermined range, the target acceleration setting module causes a change of the target acceleration with respect to a change of the accelerator opening to be substantially constant regardless of a gear position of the vehicle.

15. The system of claim 12, wherein the predetermined range is set such that the pedal reaction force F(N) applied when the accelerator opening is within the predetermined range is within a range of "2.5(N)≤F≤23(N)".

16. The system of claim 15, wherein when the accelerator opening is within the predetermined range, the target acceleration setting module causes a change of the target acceleration with respect to a change of the accelerator opening to be substantially constant regardless of a gear position of the vehicle.

17. The system of claim 15, wherein when the accelerator opening is within the predetermined range, the target acceleration setting module causes a change of the target acceleration with respect to a change of the accelerator opening to be smaller than when the accelerator opening is above the predetermined range and larger than when the accelerator opening is below the predetermined range.

18. The system of claim 17, wherein when the accelerator opening is within the predetermined range, the target acceleration setting module causes the change of the target acceleration with respect to the change of the accelerator opening to be substantially constant regardless of a gear position of the vehicle.

19. A method of controlling a control system for an engine, the control system adjusting an engine torque based on operation of an organ-type accelerator pedal for pivoting about a supporting point, the method comprising:
   acquiring an accelerator opening that is a position of the accelerator pedal;
   setting a target acceleration of a vehicle based on the acquired accelerator opening; and
   adjusting the engine torque to achieve the set target acceleration,
   wherein the setting of the target acceleration includes setting the target acceleration corresponding to the acquired accelerator opening, by using a predetermined range of the accelerator opening including a value at which the target acceleration becomes zero, and
   wherein the predetermined range is set such that a pedal reaction force F (N) applied from a predetermined position of the accelerator pedal when the accelerator opening is within the predetermined range is within a range of "2.5(N)≤F≤26(N)," the predetermined position being 172 (mm) away from the supporting point of the accelerator pedal.

* * * * *